United States Patent
Fu et al.

(10) Patent No.: US 11,507,405 B2
(45) Date of Patent: *Nov. 22, 2022

(54) ENERGY MANAGEMENT OF A COMPUTING DEPLOYMENT WITH GUARANTEED END-TO-END PERFORMANCE

(71) Applicant: VMware, Inc., Palo Alto, CA (US)

(72) Inventors: Xing Fu, Sunnyvale, CA (US); Tariq Magdon-Ismail, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 206 days.

This patent is subject to a terminal disclaimer.

(21) Appl. No.: 16/540,234

(22) Filed: Aug. 14, 2019

(65) Prior Publication Data
US 2019/0370051 A1 Dec. 5, 2019

Related U.S. Application Data

(63) Continuation of application No. 14/567,939, filed on Dec. 11, 2014, now Pat. No. 10,423,436.

(51) Int. Cl.
*G06F 9/455* (2018.01)
*H04L 41/14* (2022.01)
(Continued)

(52) U.S. Cl.
CPC ...... *G06F 9/45558* (2013.01); *G06F 11/3447* (2013.01); *H04L 41/0813* (2013.01);
(Continued)

(58) Field of Classification Search
CPC .......................... G06F 9/45558; G06F 1/3203
See application file for complete search history.

(56) References Cited

U.S. PATENT DOCUMENTS 6,108,306 A 8/2000 Kalkunte et al.
6,606,585 B1 8/2003 Borowsky et al.
(Continued)

OTHER PUBLICATIONS

Shaobo Liu et al, "An Adaptive Scheduling and Voltage/Frequency Selection Algorithm for Real-time Energy Harvesting Systems", Design Automation Conference, Jul. 2009, pp. 782-787.
(Continued)

*Primary Examiner* — Paul Yen
(74) *Attorney, Agent, or Firm* — Thomas | Horstemeyer, LLP (57) ABSTRACT

Techniques for managing energy use of a computing deployment are provided. In one embodiment, a computer system can establish a performance model for one or more components of the computing deployment, where the performance model models a relationship between one or more tunable parameters of the one or more components and an end-to-end performance metric, and where the end-to-end performance metric reflects user-observable performance of a service provided by the computing deployment. The computer system can further execute an algorithm to determine values for the one or more tunable parameters that minimize power consumption of the one or more components, where the algorithm guarantees that the determined values will not cause the end-to-end performance metric, as calculated by the performance model, to cross a predefined threshold. The computer system can then enforce the determined values by applying changes to the one or more components.

20 Claims, 5 Drawing Sheets

(51) Int. Cl.
*G06F 11/34* (2006.01)
*H04L 41/0813* (2022.01)
*H04L 41/0833* (2022.01)
*H04L 41/5009* (2022.01)
*G06F 11/30* (2006.01)

(52) U.S. Cl.
CPC ........ *H04L 41/0833* (2013.01); *H04L 41/145* (2013.01); *H04L 41/5009* (2013.01); *G06F 11/3062* (2013.01); *G06F 11/3409* (2013.01); *G06F 2009/45591* (2013.01); *G06F 2201/81* (2013.01); *Y02D 10/00* (2018.01)

(56) References Cited

U.S. PATENT DOCUMENTS

| | | |
|---|---|---|
| 6,631,267 B1 | 10/2003 | Clarkson et al. |
| 7,787,381 B2 | 8/2010 | Small et al. |
| 2009/0254660 A1 | 10/2009 | Hanson et al. |
| 2013/0232310 A1 | 9/2013 | Kruus |

OTHER PUBLICATIONS

"VMware® Distributed Power Management Concepts and Use", VMware, Inc, pp. 1-18, Palo Alto, CA.

Jose Martinez et al., "Dynamic Multicore Resource Management: A Machine Learning Approach", Sep. 2009, pp. 1-17, IEEE Computer Society.

"Configuring Dynamic Optimization and Power Optimization in VMM", Nov. 1, 2013, pp. 1-3, htttps://technetmicrosoft.com.

Wolfgang Eberle et al., "From Myth to Methodology: Cross-Layer Design for Energy-Efficient Wireless Communication", Design Automation Conference, Jun. 2005, pp. 303-308.

Dilip D. Kandlur et al., "Green Data Centers and Hot Chips", Design Automation Conference, Jul. 2009, pp. 888-890.

Qasim Ali, "Hot Power Management in VMware vSphere 5", VMware, Inc, pp. 1-10, Palo Alto, CA.

Xing Fu et al., "How Much Power Oversubscription is Safe and Allowed in Data Centers?", ACM Conference, Nov. 2011, pp. 1-10.

Harold Lim et al., "Power Budgeting for Virtualized Data Centers", ISENIX Annual Technical Conference, Jun. 2011, pp. 1-14.

Xiaorui Wang et al., "Power-Aware CPU Utilization Control for Distributed for Distributed Real-Time Systems", RTAS Conference, Apr. 2009, pp. 1-5.

Kai Ma et al., "Scalable Power Control for Many-Core Architectures Running Multi-threaded Applications", 38th annual International Symposium on Computer Architecture, Jun. 4-8, 2011, pp. 1-12.

Joshua Reich et al., "Sleepless in Seattle No Longer", ISENIX Annual Technical Conference, Jun. 2010, pp. 1-14.

Luiz Andrew Barroso et al., "The Case for Energy-Proportional Computing", IEEE Computer Society, Dec. 2007, pp. 33-37.

Huang Huang et al., "Throughput Maximization for Periodic Real-Time Systems under the Maximal Temperature Constraint", ACM Transactions on Embedded Computing Systems, vol. 1, No. 1, Article 1, Jun. 2013, pp. 1-20.

Jilong Kuang et al., "Traffic-Aware Power Optimization for Network Applications on Multicore Servers", Design Automation Conference, Jun. 3-7, 2012, San Francisco, CA, pp. 1006-1011.

"Xen Power Management", A Linux Foundation Collaborative Project, wiki.xen.org/wiki/Xen power management, pp. 1-9.

ENERGY MANAGEMENT OF A COMPUTING DEPLOYMENT WITH GUARANTEED END-TO-END PERFORMANCE

This application is a continuation of and claims the benefit of co-pending U.S. patent application Ser. No. 14/567,939, filed Dec. 11, 2014 entitled "Energy Management of a Computing Deployment with Guaranteed End-to-End Performance," which is incorporated herein by reference in its entirety.

BACKGROUND

With the rapid growth in popularity of cloud-based services such as virtual desktop infrastructure (VDI), mobile/web applications, streaming content delivery, online gaming, and the like, effectively managing the energy use of computing deployments that host such services has become a priority for deployment operators (e.g., IT organizations and cloud service providers) seeking to contain their energy costs and reduce their environmental footprint. These computing deployments typically consist of complex systems of interconnected server, storage, and networking components. Accordingly, it has proven challenging to, minimize deployment-wide energy consumption while at the same time satisfying performance requirements.

Several researchers have studied aspects of energy management for pieces of a computing deployment, such as the server tier, the storage tier, etc. However, these studies address the individual pieces in isolation, and thus do not provide an integrated solution for managing energy use of a deployment as a whole. Further, these existing studies generally focus on enforcing server-side performance constraints—in other words, constraints based on server-side performance metrics such as CPU utilization or throughput. Such server-side performance metrics often fail to properly reflect the quality of an end-user's experience with a cloud-based service, which is of prime importance for interactive services like VDI.

SUMMARY

Techniques for managing energy use of a computing deployment are provided. In one embodiment, a computer system can establish a performance model for one or more components of the computing deployment, where the performance model models a relationship between one or more tunable parameters of the one or more components and an end-to-end performance metric, and where the end-to-end performance metric reflects user-observable performance of a service provided by the computing deployment. The computer system can further execute an algorithm to determine values for the one or more tunable parameters that minimize power consumption of the one or more components, where the algorithm guarantees that the determined values will not cause the end-to-end performance metric, as calculated by the performance model, to cross a predefined threshold. The computer system can then enforce the determined values by applying changes to the one or more components.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

The present disclosure describes techniques for minimizing the energy consumption of a computing deployment that hosts a service (e.g., VDI, a mobile/web application, etc.), while at the same time guaranteeing that the "end-to-end performance" of the service—in other words, the performance experienced by end-users—is not, adversely affected. At a high level, these techniques can include establishing, by a computer system associated with the computing deployment (e.g., a management controller), a performance model for one or more components of the deployment, where the performance model is a mathematical function that models the relationship between certain tunable parameters of the components and an end-to-end performance metric (i.e., a metric reflecting performance observable by an end-user interacting with the service). For example, in the case of VDI, the end-to-end performance metric may be user-perceived latency for executing a desktop operation. As another example, in the case of a web application, the end-to-end performance metric may be user-perceived latency for completing a HyperText Transfer Protocol (HTTP) request/response cycle.

The management controller can then, at an appropriate time, execute an optimization algorithm to determine values for the tunable parameters that minimize energy (specifically, power) consumption of the deployment components, where the optimization algorithm guarantees that the determined parameter values will not cause the end-to-end performance metric, as calculated by the performance model, to cross a predefined threshold. For instance, if the end-to-end performance metric is a metric where lower values indicate better performance (e.g., latency), the optimization algorithm can ensure that the calculated value of the metric does not exceed the predefined threshold. Alternatively, if the end-to-end performance metric is a metric where higher values indicate better performance (e.g., operations per unit time, download/upload speed, etc.), the optimization algorithm can ensure that the calculated value of the metric does not fall below the predefined threshold. The threshold itself can be determined from, e.g., a predetermined service level agreement that guarantees a minimum level or quality of service for end-users. In certain embodiments, for the sake of performance and scalability, this algorithm can take into account heuristics that are specific to the tunable parameters and that are based upon principles/observations regarding the interactions between those parameters and energy usage/savings.

Finally, the management controller can automatically enforce the determined parameter values by applying (either directly or indirectly) changes to the deployment components that cause those values to go into effect.

With the energy management approach described above, embodiments of the present disclosure can advantageously reduce the energy consumption of a computing deployment without violating end-to-end performance constraints for a particular workload. This is in contrast to existing energy management approaches, which generally rely on server-side performance constraints that are poorly correlated with the end-user experience, and therefore cannot guarantee a certain level of performance for end-users. Further the approach above can be flexibly used to minimize energy consumption of one, a subset, or all of the components (e.g., server, storage, networking, etc.) in a computing deployment. The only changes required to accommodate such variations involve (1) modifying the performance model to include appropriate tunable parameters for each type of component (or to establish a different performance model for each component type), and (2) modifying the optimization algorithm to take into account the power consumption of each type of component. Thus, embodiments of the present disclosure can advantageously provide an integrated solution, for managing the energy use of a computing deployment as whole (e.g., the entire chain of components between the end-user client device and the backend server), rather than individual pieces of the deployment.

The foregoing and other aspects of the present disclosure are described in further detail in the sections that follow.

2. System Environment

Figure 1:
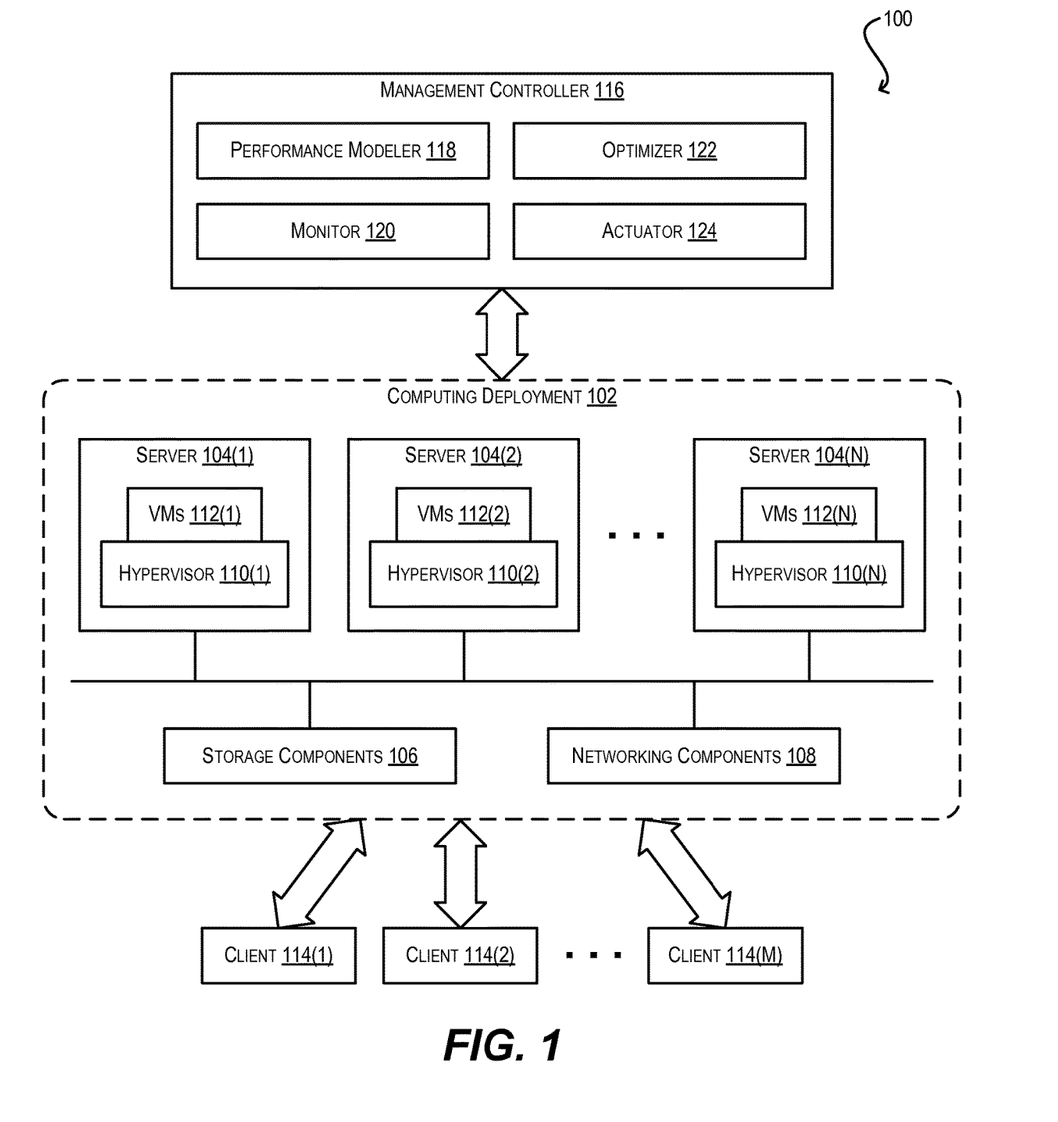
FIG. 1 depicts a system environment, comprising a computing deployment according to an embodiment.

FIG. 1 depicts a system environment 100 that comprises an exemplary computing deployment 102 according to an embodiment. As shown, computing deployment 102 includes a number of servers 104(1)-104(N) that are communicatively coupled with storage components 106 and networking components 108. Servers 104(1)-104(N), which correspond to physical computer systems (e.g., rack-mounted or standalone systems), can host one or more services that are consumed by end-users operating client devices 114(1)-114(M). For example, in the embodiment of FIG. 1, each server 104(1)-104(N) executes a virtualization software layer (i.e., hypervisor) 110(1)-110(N) that provides an environment in which one or more virtual machines (VMs) 112(1)-112(N) run. Each VM 112(1)-112(N), in turn, can run appropriate guest software (not shown) for delivering a service to one or more client devices 114(1)-114(N), such as a virtual desktop, a web application, a streaming video, etc.

Storage components 106, which can be implemented using, e.g., dedicated storage arrays or commodity hard disks/flash disks, can provide storage resources within computing deployment 102. For instance, storage components 106 can store persistent information for the software running on servers 104(1)-104(N), such as VMs 112(1)-112(N) and their guest applications.

Networking components 108, which can include switches, routers, and the like, can manage the flow of network traffic within, and into/out of, computing deployment 102. For example, networking components 108 can enable servers 104(1)-104(N) to communicate with each other, as well as other entities inside and outside of deployment 102(like clients 114(1)-114 (M)), using appropriate networking protocols.

As noted in the Background section, one challenge with managing a computing deployment like deployment 102 of FIG. 1 involves minimizing deployment-wide energy consumption (in order to curb energy costs and environmental impact), while at the same time meeting the performance requirements/expectations of the end-users of the deployment's hosted service. Existing approaches for energy management generally address this problem in a piecemeal fashion (e.g., by considering energy management of individual components in isolation), and/or fail to address the end-user experience by solely enforcing server-side (rather than end-to-end) performance constraints.

To overcome the foregoing (and other) drawbacks of existing energy management approaches, system environment 100 of FIG. 1 includes a management controller 116 (e.g., a computer system or cluster of computer systems) that comprises a novel performance modeler module 118, monitor module 120, optimizer module 122, and actuator module 124. As described in further detail below, modules 118-124 of management controller 116 can work in concert to minimize the total energy consumption of the various components of computing deployment 102, and simultaneously ensure that this minimization will not cause the end-to-end performance perceived by end-users operating client devices 114(1)-114(M) to fall below a predetermined level (e.g., violate a predetermined service-level agreement).

It should be appreciated that system environment 100 of FIG. 1 is illustrative and not intended to limit the embodiments disclosed herein. For instance, although performance modeler 118, monitor 120, optimizer 122, and actuator 124 are shown as being part of a single management controller 116, in other embodiments one or more of these modules may be implemented on separate physical machines. Further, although servers 104(1)-104(N) are shown as executing hypervisors 110(1)-110(N) and VMs 112(1)-112(N), in other embodiments one or more of servers 104(1)-104(N) may execute different types of software (in addition to, or in lieu of, hypervisors 110(1)-110(N)/VMs 112(1)-112(N)) that are appropriate for the services they are configured to host. One of ordinary skill in the art will recognize many variations, modifications, and alternatives.

3. High-Level Workflow

Figure 2:
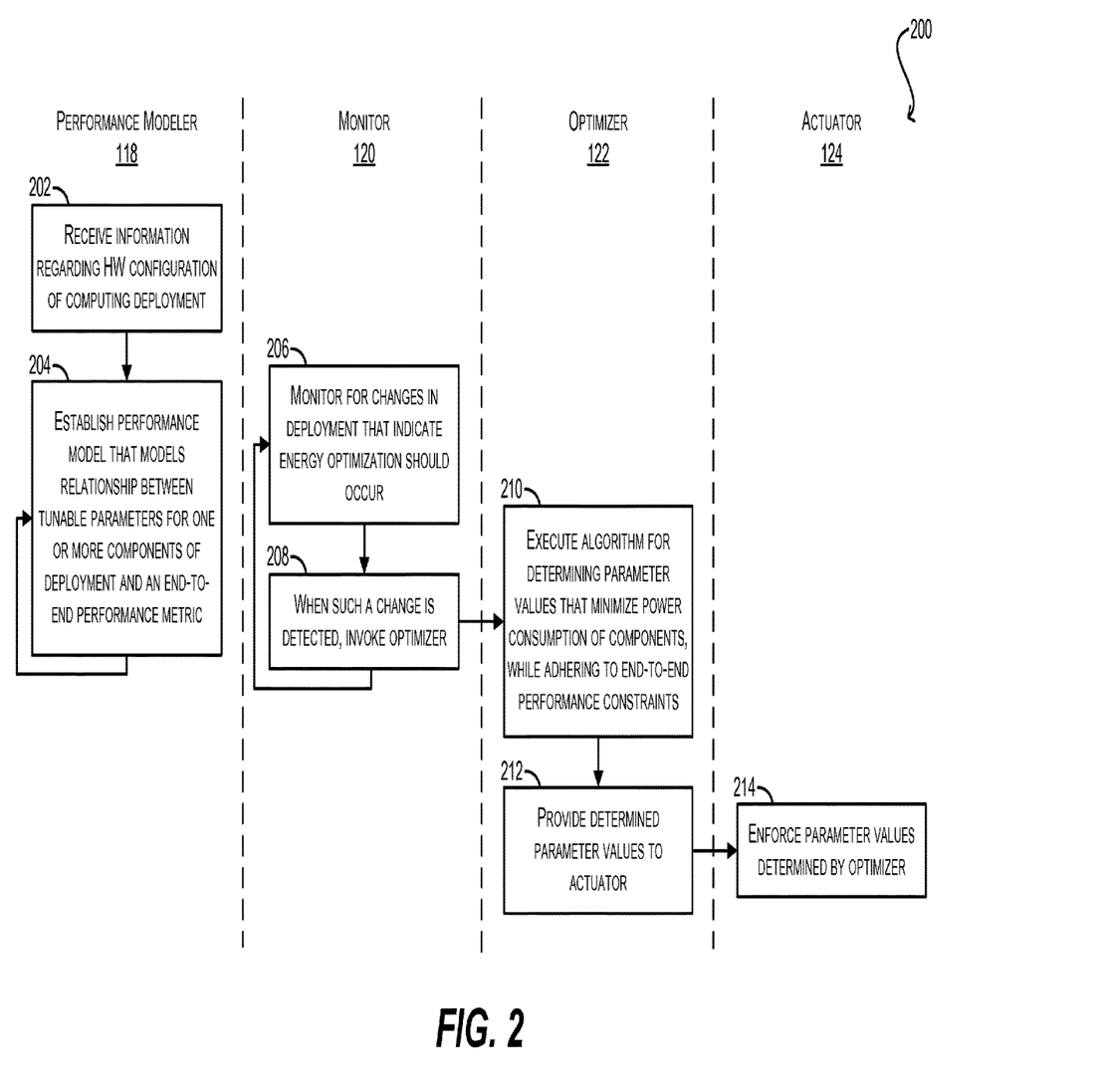
FIG. 2 depicts An energy management workflow performed within the system environment of FIG. 1 according to an embodiment.

FIG. 2 depicts a high-level workflow 200 that can be carried out by performance modeler 118, monitor 120, optimizer 122, and actuator 124 of FIG. 1 for managing the energy use of computing deployment 102 according to an embodiment. Starting with block 202, performance modeler 118 can first receive information regarding the hardware configuration of computing deployment 102. This information can include, e.g., the number of servers 104(1)-104(N) in the deployment, the number of CPUs installed on each server and their supported CPU frequency ranges, the number of storage components 106 and the characteristics of those components, the number of networking components 108 and the characteristics of those components, and so on. In one embodiment, performance modeler 118 can receive the hardware configuration information automatically from telemetry agents installed on each component of computing deployment 102. In alternative embodiments, performance modeler 118 can receive the hardware configuration information through manual definition by an administrator.

At block 204, performance modeler 118 can establish a performance model for one or more components of computing deployment 102 (e.g., servers 104(1)-104(N), storage components 106, and/or networking components 108). Generally speaking, this performance model is a mathematical function that maps values for one or more tunable (i.e., controllable) parameters of the components to values for an end-to-end performance metric. As mentioned previously, the end-to-end performance metric is a metric that directly reflects the quality of experience for an end-user interacting with a service provided by computing deployment 102. For example, in embodiments where computing deployment 102 is a VDI deployment, the end-to-end performance metric may be the response time/latency for executing a desktop operation. In other embodiments, the end-to-end performance metric may be different based on the nature of the service being offered.

The tunable parameters described at block 204 are parameters that affect the energy consumption of the components they are associated with. For instance, in the case of servers 104(1)-104(N), the tunable parameters can include, e.g., CPU frequency (ether chip-wide or per core/tile) and VM consolidation ratio (i.e., the number of active VMs per server). In the case of storage components 106, the tunable parameters can include, e.g., disk space utilization and disk rotational speed (if magnetic hard disks are used). And in the case of networking components 108, the tunable parameters can include the number of active ports per network device and per-port bandwidth. The specific tunable parameters that are used by the performance model will depend on the configurability of the components of computing deployment 102 and a determination of which components should be included in the energy management process.

In certain embodiments, performance modeler 118 can establish the performance model at block 204 using a "black box" approach, where, performance modeler 118 iteratively (1) adjusts/varies the tunable parameters over allowable ranges, (2) provides the adjusted parameter values as inputs to an instrumentation framework implemented within computing deployment 102, and (3) measures (via the instrumentation framework) the value of the end-to-end performance metric. The resulting data points, corresponding to the parameter values and the measured performance metric values can then be surface fitted to a function representing the performance model. In further embodiments, performance modeler 118 can periodically repeat the processing of block 204, thereby recalibrating the performance model in response to certain events or changes in computing deployment 102 that may cause the performance model to become stale. These and other aspects of the operation of performance modeler 118 are described in section (4) below.

Once the performance model has been established per block 204, monitor 120 can monitor for changes in computing deployment 102 (during deployment runtime) that indicate energy optimization of the components of deployment 102 should occur (block 206). For example, in the context of a VDI deployment, such a change may be an adjustment in the total number of active desktop users. In other types of deployments, such a change may be an adjustment of a different factor or variable that impacts load on the deployment components. When such a change is detected, monitor 120 can invoke optimizer 122 (block 208), In addition, monitor 120 can return to block 206 in order to monitor for further changes.

Upon being invoked by monitor 120, optimizer 122 can execute an optimization algorithm for determining values for the tunable parameters discussed with respect to block 204 that minimize energy (specifically, power) consumption of the associated components (block 210). Significantly, this algorithm can take into account a performance constraint imposed on the end-to-end performance metric that prevents the determined parameter values from causing the end-to-end performance metric, as calculated by the performance model, to cross (e.g., either exceed or fall below, depending on the nature of the metric) a predefined threshold. In this manner, optimizer 122 can ensure that the optimization process does not degrade end-user performance to an unacceptable level (e.g., below a user-defined quality of service, or QoS, as defined in a predetermined service-level agreement).

In one embodiment, the optimization algorithm executed at block 210 can be a theoretically optimal algorithm that can be solved using a mixed-integer, nonlinear programming (MINLP) solver. In other embodiments, the optimization algorithm can be a heuristics-based algorithm that does not generate a theoretically optimal solution, but generates a near optimal solution with less algorithmic complexity than the optimal algorithm, thereby offering better scalability/performance. One example of such a heuristics-based algorithm—specifically, an algorithm that prioritizes the minimization of static power consumption (i.e., power consumed by running components, regardless of their load or configured performance level) over the minimization of dynamic power consumption (i.e., power consumed at different levels of component performance, such as different levels of CPU frequency)—is described in section (5) below.

At block 212, optimizer 122 can provide the parameter values determined via the optimization algorithm of block 210 to actuator 124. Finally, at block 214, actuator 124 can enforce the parameter values by applying (either directly or indirectly) changes to the components of computing deployment 102 that cause those values to go into effect.

As noted in the Overview section, the high-level energy management workflow shown in FIG. 2 provides a number of advantages over existing energy management approaches. First, by establishing a performance model based on an end-to-end performance metric (rather than a server-side metric) and then optimizing energy use in view of that metric, workflow 200 of FIG. 2 can minimize energy consumption of computing deployment 102 without adversely impacting the end-user experience. This is particularly useful for deployments that deliver interactive services/application to end-users, such as VDI deployments, web application deployments, and the like.

Second, since the performance model and the optimization algorithm can take into account multiple different types of components in computing deployment 102 (e.g., servers 104(1)-104(N), storage components 106, networking components 108, and/or client devices 114(1)-114(M)), workflow 200 can effectively enable deployment-wide energy management, instead of being limited to specific component types.

4. Performance Modeler

Figure 3:
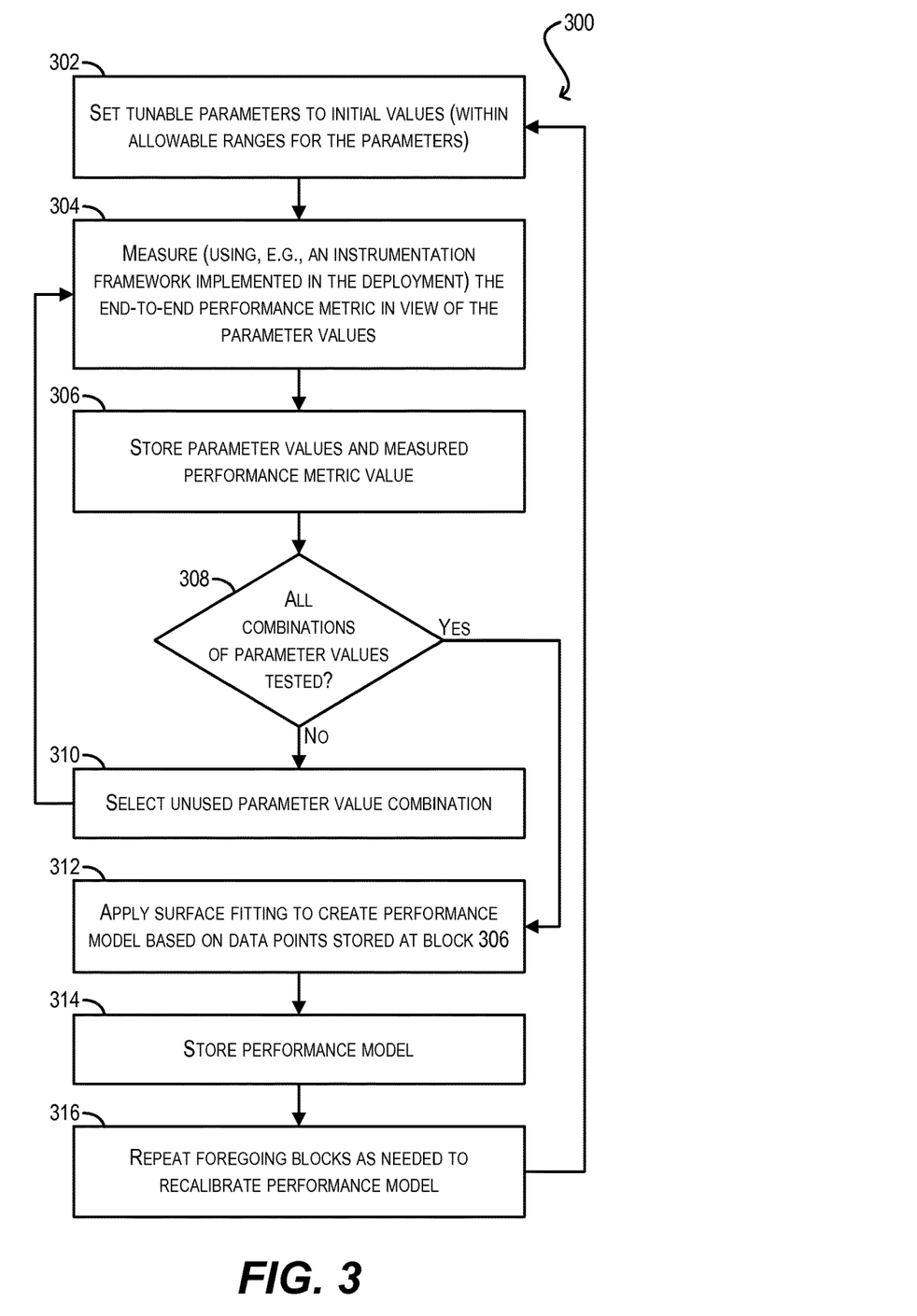
FIG. 3 depicts a flowchart for establishing a performance model according to an embodiment.

FIG. 3 depicts a flowchart 300 that provides additional details regarding the processing that performance modeler 118 may perform to establish a performance model per block 204 of FIG. 2 according to an embodiment. In particular, flowchart 300 describes a "black-box" approach that is based on empirical data.

At block 302, performance modeler 118 can set the tunable parameters for the components to be optimized in computing deployment 102 to initial values within allowable ranges for those parameters. For instance, if the tunable parameters include CPU frequency for servers 104(1)-104(N) and the supported hardware frequency range for these machines is 800 Mhz to 1.9 Ghz, the CPU frequency parameter can be initialized to the top of the supported hardware frequency range (i.e., 1.9 Ghz).

At block 304, the parameter values can be passed to an instrumentation framework implemented within computing deployment 102, which can measure a value for the end-to-end performance metric with those parameter values in effect. For example, in the VDI use case, the instrumentation framework can simulate a user virtual desktop workload, in the deployment and can measure the 95th percentile of client-side latency for a set of desktop operations (e.g., open application, edit document, save document, etc.), Then, at block 306, performance modeler 118 can store the parameter values and the measured performance metric value.

At block 308, performance modeler 118 can check whether all selected combinations of the tunable parameters have been tested via the instrumentation framework. If not, performance modeler 118 can select an unused parameter value combination (by, e.g., decrementing or incrementing one or more of the parameter values) and can repeat blocks 304-306 to measure and store performance metric values for this new combination.

On the other hand, if performance modeler 118 determines that all selected combinations of parameter values have been tested at block 308, performance modeler 118 can conclude that all necessary data points have been collected. In response, performance modeler 118 can apply surface fitting to create the performance model based on the data points stored (over the various iterations of blocks 304-308) at block 306 (block 312).

By way of example, listed below is one possible performance, model that may be created per block 312 in the context of a VDI deployment:

$$Q_i(f_i, R_i) = K_i \left( \frac{a_1}{f_i} + a_2 \right)(b_1 R_i^2 + b_2 R_i + b_3) \qquad \text{Equation (1)}$$

In this example, $Q_i$ represents the performance model for the i-th server in the deployment, where the tunable parameters are server CPU frequency ($f_i$) and VM consolidation ratio ($R_i$), and where the end-to-end performance metric is the 95th percentile of response time (i.e., latency) for desktop operations. Constant $K_i$ denotes response time when only one desktop VM is running on the i-th server and its CPU runs at maximum frequency. The term $$\frac{a_1}{f_i} + a_2$$

represents response time inflation due to CPU frequency throttling, and equals 1 when $f_i = f_{max}$ (i.e., maximum CPU frequency). The term $b_1 R_i^2 + b_2 R_i + b_3$ represents response time inflation due to VM consolidation, and equals 1 when $R_i = 1$. And in one embodiment, the coefficient of determination $R^2$ equals 0.85.

Turning back to flowchart 300, once the performance model has been created, performance modeler 118 can store the performance model for later use (in, e.g., a storage component 106 of FIG. 1) (block 314). Finally, at block 316, performance modeler 118 can repeat foregoing blocks 302-314 as-needed in order to recalibrate the performance model on a periodic basis. Such recalibration may be needed if, e.g., environmental changes, like hardware upgrades, changes in user workloads, etc., occur that affect the measured end-to-end performance metric. In scenarios where these types of changes are likely, performance modeler 118 (or some other component of management controller 116) can periodically re-measure the end-to-end performance metric via the instrumentation framework and compare the re-measured value to the value predicted by the performance model. If there is a large deviation between the re-measured and predicted values, performance modeler 118 can determine that the performance model has become stale and should be recalibrated. Alternatively or in addition, performance modeler 118 can recalibrate the performance model upon detecting specific types of events (e.g., an upgrade event or a component failure).

It should be appreciated that flowchart 300 of FIG. 3 is illustrative and various modifications are possible. For instance, although flowchart 300 describes the establishment of a single performance model (that is recalibrated as-needed), in certain embodiments multiple performance models may be established that reflect different operational scenarios (e.g., one performance model for weekday morning user workloads, another performance model for weekday afternoon user workloads, and yet another performance model for weekend/holiday user workloads). These different performance models can then be used by optimizer 122 at the appropriate times to more accurately optimize energy usage given the performance characteristics of the deployment at those times.

Further, although a specific sequence of steps is shown in FIG. 3, other sequences of steps may be performed in other embodiments. For example, steps described as sequential can be executed in parallel, order of steps can be varied, and steps may be modified, combined, added, or omitted. One of ordinary skill in the art will recognize many variations, modifications, and alternatives.

5. Optimizer

As noted above, once performance modeler 118 has established a performance model for computing deployment 102, optimizer 122 can use the performance model to determine values for the tunable parameters of the deployment's components that minimize energy (e.g., power) consumption of those components, subject to the constraint that the determined parameters values will not cause the end-to-end performance metric (as calculated using the performance model) to cross a user-defined threshold (or, more particularly, violate a predetermined service-level agreement). In one embodiment, this determination can be performed by executing a theoretically optimal algorithm that involves minimizing a power cost function modeled via high-dimensional fitting. For instance, in the context of the exemplary VDI deployment described with respect to performance model equation (1), the theoretically optimal algorithm can involve minimizing the following power cost function $P_{VDI}$:

$$P_{VDI} = \sum_{i=1}^{N_{host}} S_i \left( \alpha_i f_i^{\beta_i} + M_i R_i + L_i \right) \qquad \text{Equation (2)}$$

subject to:

-continued $$Q_i(f_i, R_i) \leq QoS \quad \text{Equation (3)}$$
$$f_{i,min} \leq f_i \leq f_{i,max}$$
$$\sum_{i=1}^{N_{host}} R_i = N_{VM}$$

In these equations, $\alpha_i$, $\beta_i$, and $M_i$, are server-specific parameters, $N_{host}$ is the total number of servers in the VDI deployment, $N_{VM}$ is the total number of active desktop VM users, QoS is the user-specified performance threshold or service-level agreement (in terms of response time), and $f_{i,min}$ and $f_{i,max}$ are minimum-and maximum CPU frequencies of the i-th server.

One problem with the foregoing optimization formulation is that it cannot be solved, by existing solvers directly. It is possible to transform this formulation into a canonical form that makes use of mixed integer, non-linear programming (MINLP). However, the canonical form still suffers from performance and scalability issues, since conventional MINLP solvers cannot solve it in polynomial time (thereby making it impractical for use in very large deployments).

Figure 4:
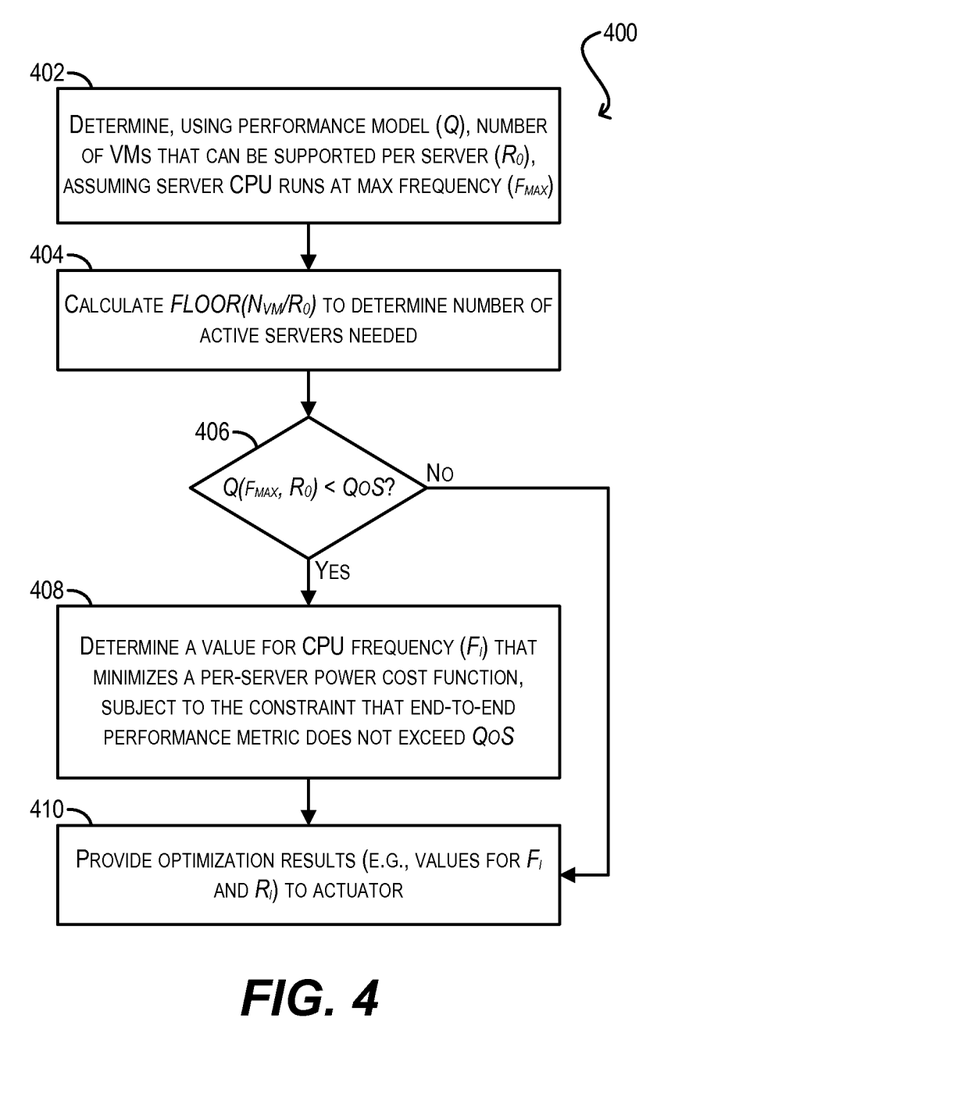
FIG. 4 depicts a flowchart for determining parameter values that minimize power consumption of a computing deployment based on the performance model established via FIG. 3 according to an embodiment.

To address these issues, FIG. 4 depicts a flowchart 400 of an alternative, heuristics-based algorithm that can be performed by optimizer 122 for determining values for the tunable-parameters (i.e., $f_i$ and $R_i$) of the VDI deployment described in the examples above according to an embodiment. At a high level, the algorithm embodied by flowchart 400 is based on the observation that static power consumption is much greater than dynamic power consumption in a typical VDI deployment. Thus, the algorithm first attempts to consolidate VMs into as few servers as possible (thereby allowing the idle servers to be shut down). The algorithm then throttles the CPUs of the active servers to the extent possible to minimize power consumption of the active servers, while still maintaining the level of performance indicated by the user-defined performance threshold (QoS). With this algorithm, optimizer 122 can determine near optimal values for $f_i$ and $R_i$, but in substantially less time than the theoretically optimal algorithm embodied by equations (2) and (3).

Starting with block 402, optimizer 122 can first determine (using performance model a $Q_i$ of equation (1)) the number of VMs that can be supported by each server in the VDI deployment ($R_0$), assuming the CPU of the server operates at maximum frequency ($f_{max}$).

At block 404, optimizer 122 can determine the number of servers needed to support those VMs by calculating $$\text{floor}\left(\frac{N_{VM}}{R_0}\right).$$

At block 406, optimizer 122 can check to see whether $Q(f_{max}, R_0)$ is less than QoS (indicating that CPU throttling is possible without exceeding QoS). If so, optimizer 122 can determine a value for CPU frequency ($f_i$) that minimizes a per-server power cost function, subject to the constraint that the end-to-end performance metric (as calculated by $Q_i(f_i, R_i)$) does not exceed QoS (block 408). One example of this power cost function and its constraints are shown below.

$$P_i = \alpha_i f_i^{\beta_i} + M_i R_i + L_i \quad \text{Equation(4)}$$

subject to:

$$Q_i(f_i, R_i) \leq QoS$$
$$f_{i,min} \leq f_i \leq f_{i,max} \quad \text{Equation(5)}$$

Then, at block 410, optimizer 122 can provide the optimization results (i.e., determined values for $f_i$ and $R_i$) to actuator 124 for enforcement within the deployment. For example, actuator 124 can shut down the idle physical servers, as well as cause the CPU of each active server to be throttled per frequency value $f_i$.

It should be recognized that, while flowchart 400 illustrates a specific optimization algorithm designed for a VDI deployment having tunable, server-level parameters $f_i$ and $R_1$, the heuristics underlying this algorithm—namely, the prioritization of static power consumption minimization over dynamic power consumption minimization—are equally applicable to other types of deployments whose tunable parameters may correspond to other types of components (e.g., storage components, networking components, etc.). Accordingly, the principles of flowchart 400 can be easily extended to support such alternative deployments.

6. Actuator

Figure 5:
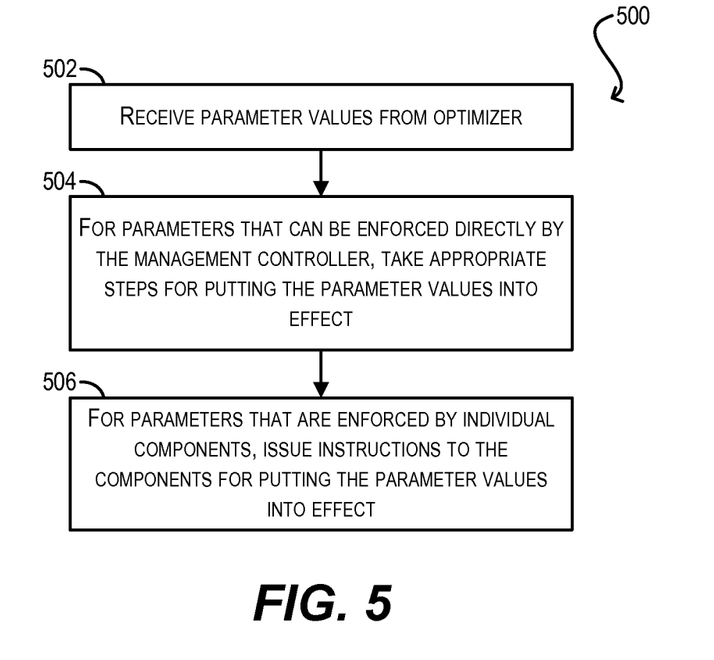
FIG. 5 depicts a flowchart for enforcing the parameter values determined via FIG. 4 according to an embodiment.

FIG. 5 depicts a flowchart 500 that can be performed by actuator 124 to enforce the parameter values determined by optimizer 122 (per block 214 of FIG. 2) according to an embodiment.

At block 502, actuator 124 can receive the parameter values from optimizer 122. For parameters that can be enforced directly by management controller 116, actuator 124 can cause those parameter values to go into effect (block 504). For example, in the case where the parameter is VM consolidation ratio or storage consolidation ratio, actuator 124 can use live VM migration (e.g., vMotion) or live storage migration (e.g., storage vMotion) to move VMs or data as needed across host/storage systems and can shut down the idle machines.

For parameters that are enforced by the individual deployment components, actuator 124 can issue instructions to those components for putting the, parameter values in effect (block 506). For example, in the case where CPU frequencies are throttled, actuator 124 can communicate the new CPU frequency to an agent resident in each server. The agent can then invoke appropriate commands on the server to modify the server's CPU frequency.

Certain embodiments described herein involve a hardware abstraction layer on top of a host computer (e.g., server). The hardware abstraction layer allows multiple containers to share the hardware resource. These containers, isolated from each other, have at least a user application running therein. The hardware abstraction layer thus provides benefits of resource isolation and allocation among the containers. In the foregoing embodiments, VMs are used as an example for the containers and hypervisors as an example for the hardware abstraction layer. As described above, each VM includes a guest operating system in which at least one application runs. It should be noted that these embodiments may also apply to other examples of containers, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Further embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in -terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory; random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component, can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiment may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method, comprising:
    establishing, by a computer system, a performance model configured to model a relationship between a frequency of a CPU of a server of a plurality of servers and an end-to-end performance metric that reflects a response time of an instrumentation framework that measures a latency for executing a set of desktop operations of a virtual desktop infrastructure (VDI) service provided by the plurality of servers combined with an inflation of the response time due to a throttling of the frequency of the CPU and virtual machine (VM) consolidation, wherein the set of desktop operations comprises at least one of: an open application operation, an edit document operation, or a save document operation;
    determining, by the computer system, a VM consolidation ratio that can be supported by each server in the plurality of servers assuming a CPU of each server runs at a frequency that is in a supported CPU frequency range;
    calculating, by the computer system, a total number of active servers needed based on the determined VM consolidation ratio and a number of users;
    calculating, by the computer system, a reduced CPU frequency that reduces a power consumption function for each active server; and
    for each active server, throttling the CPU of the server based on the reduced CPU frequency.

2. The method of claim 1, wherein calculating the reduced CPU frequency is subject to a constraint that the reduced CPU frequency cannot cause the end-to-end performance metric for the performance model to cross a predefined threshold.

3. The method of claim 2, wherein the constraint is based at least in part on a response time inflation factor due to the reduced CPU frequency.

4. The method of claim 1, wherein throttling the CPU of the server based on the reduced CPU frequency comprises:
communicating, by the computer system, the reduced CPU frequency to an agent on the server.

5. The method of claim 1, further comprising:
measuring, by the computer system, the response time using the instrumentation framework.

6. The method of claim 5, further comprising:
communicating, by the computer system, a top of the supported CPU frequency range to the instrumentation framework.

7. The method of claim 1, wherein the set of desktop operations comprises the open application operation, the edit document operation, and the save document operation.

8. A non-transitory computer readable storage medium having stored thereon program code executable by a computer system, the program code embodying a method, comprising:
establishing, by the computer system, a performance model configured to model a relationship between a frequency of a CPU of a server of a plurality of servers and an end-to-end performance metric that reflects a response time of an instrumentation framework that measures a latency for executing a set of desktop operations of a virtual desktop infrastructure (VDI) service provided by the plurality of servers combined with an inflation of the response time due to a throttling of the frequency of the CPU and virtual machine (VM) consolidation, wherein the set of desktop operations comprises at least one of: an open application operation, an edit document operation, or a save document operation;
determining, by the computer system, a VM consolidation ratio that can be supported by each server in the plurality of servers assuming a CPU of each server runs at a frequency that is in a supported CPU frequency range;
calculating, by the computer system, a total number of active servers needed based on the determined VM consolidation ratio and a number of users;
calculating, by the computer system, a reduced CPU frequency that reduces a power consumption function for each active server; and
for each active server, throttling the CPU of the server based on the reduced CPU frequency.

9. The non-transitory computer readable storage medium of claim 8, wherein calculating the reduced CPU frequency is subject to a constraint that the reduced CPU frequency cannot cause the end-to-end performance metric for the performance model to cross a predefined threshold.

10. The non-transitory computer readable storage medium of claim 9, wherein the constraint is based at least in part on a response time inflation factor due to the reduced CPU frequency.

11. The non-transitory computer readable storage medium of claim 8, wherein throttling the CPU of the server based on the reduced CPU frequency comprises:
communicating, by the computer system, the reduced CPU frequency to an agent on the server.

12. The non-transitory computer readable storage medium of claim 8, further comprising:
measuring, by the computer system, the response time using the instrumentation framework.

13. The non-transitory computer readable storage medium of claim 12, further comprising:
communicating, by the computer system, a top of the supported CPU frequency range to the instrumentation framework.

14. The non-transitory computer readable storage medium of claim 8, wherein the set of desktop operations comprises the open application operation, the edit document operation, and the save document operation.

15. A computer system, comprising:
at least one memory storing at least one component; and
at least one processor programmed to execute the at least one component to:
establish a performance model configured to model a relationship between a frequency of a CPU of a server of a plurality of servers and an end-to-end performance metric that reflects a response time of an instrumentation framework that measures a latency for executing a set of desktop operations of a virtual desktop infrastructure (VDI) service provided by the plurality of servers combined with an inflation of the response time due to a throttling of the frequency of the CPU and virtual machine (VM) consolidation, wherein the set of desktop operations comprises at least one of: an open application operation, an edit document operation, or a save document operation;
determine a VM consolidation ratio that can be supported by each server in the plurality of servers assuming a CPU of each server runs at a frequency that is in a supported CPU frequency range;
calculate a total number of active servers needed based on the determined VM consolidation ratio and a number of users;
calculate a reduced CPU frequency that reduces a power consumption function for each active server; and
for each active server, throttle the CPU of the server based on the reduced CPU frequency.

16. The computer system of claim 15, wherein calculating the reduced CPU frequency is subject to a constraint that the reduced CPU frequency cannot cause the end-to-end performance metric for the performance model to cross a predefined threshold.

17. The computer system of claim 16, wherein the constraint is based at least in part on a response time inflation factor due to the reduced CPU frequency.

18. The computer system of claim 15, wherein throttling the CPU of the server based on the reduced CPU frequency comprises the at least one processor further programmed to execute the at least one component to:
communicate the reduced CPU frequency to an agent on the server.

19. The computer system of claim 15, wherein the at least one processor is further programmed to execute the at least one component to:
measure the response time using the instrumentation framework.

20. The computer system of claim 19, wherein the at least one processor is further programmed to execute the at least one component to:
communicate a top of the supported CPU frequency range to the instrumentation framework.

* * * * *